United States Patent [19]

Paul

[11] Patent Number: 4,519,581
[45] Date of Patent: May 28, 1985

[54] FAUCET HANDLE
[75] Inventor: Stanley M. Paul, Rye, N.Y.
[73] Assignee: Paul Associates, Inc., Long Island City, N.Y.
[21] Appl. No.: 587,712
[22] Filed: Mar. 8, 1984
[51] Int. Cl.³ .............................................. F16K 31/44
[52] U.S. Cl. .................................... 251/268; 251/312; 137/315
[58] Field of Search ............... 251/264, 265, 266, 267, 251/268, 269, 270, 271, 272, 312; 137/606, 315; 16/121, 123, DIG. 24, DIG. 30

[56] References Cited

U.S. PATENT DOCUMENTS

| | | | |
|---|---|---|---|
| 1,910,491 | 5/1933 | Lynn | 251/272 |
| 3,082,786 | 3/1963 | McLean | 251/267 |
| 3,830,464 | 8/1974 | Parker | 251/269 |
| 4,078,763 | 3/1978 | Yamamoto | 137/315 |
| 4,214,603 | 7/1980 | Hall et al. | 137/315 |

FOREIGN PATENT DOCUMENTS

| | | | |
|---|---|---|---|
| 537039 | 10/1955 | Belgium | 137/315 |
| 521251 | 3/1955 | Italy | 251/269 |

Primary Examiner—Samuel Scott
Assistant Examiner—B. J. Bowman
Attorney, Agent, or Firm—Blum, Kaplan, Friedman, Silberman & Beran

[57] ABSTRACT

A faucet handle for a cartridge type non-rising valve including a lower anchoring piece and an upper anchoring piece secured to the non-rising valve casing with a rotation member disposed between the upper and lower anchoring pieces and coupled to the non-rising valve stem to rotate the valve through a limited arc of rotation.

15 Claims, 8 Drawing Figures

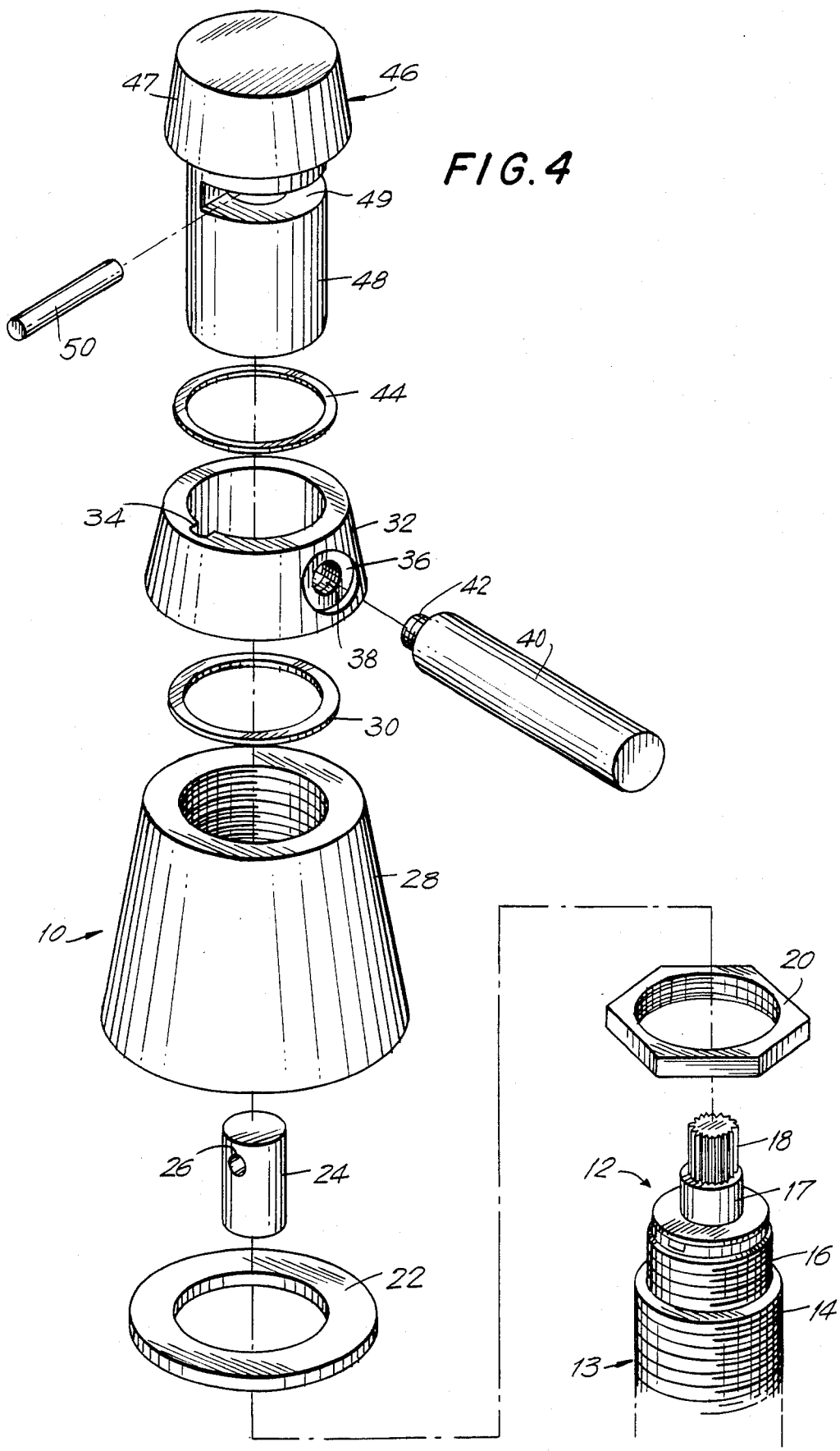

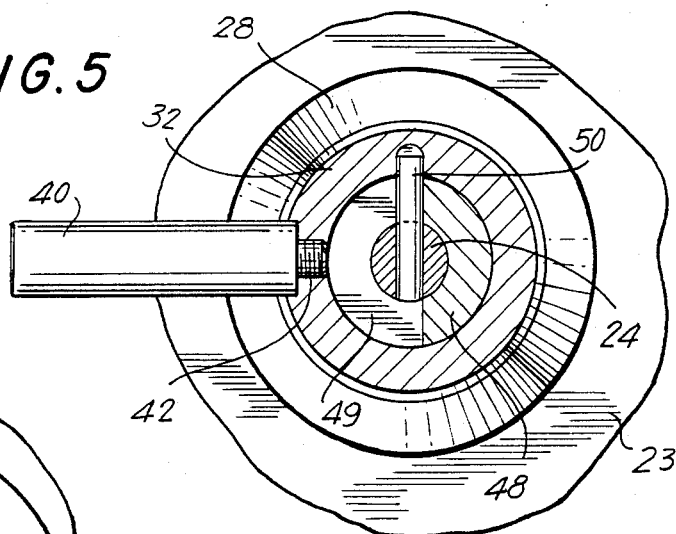
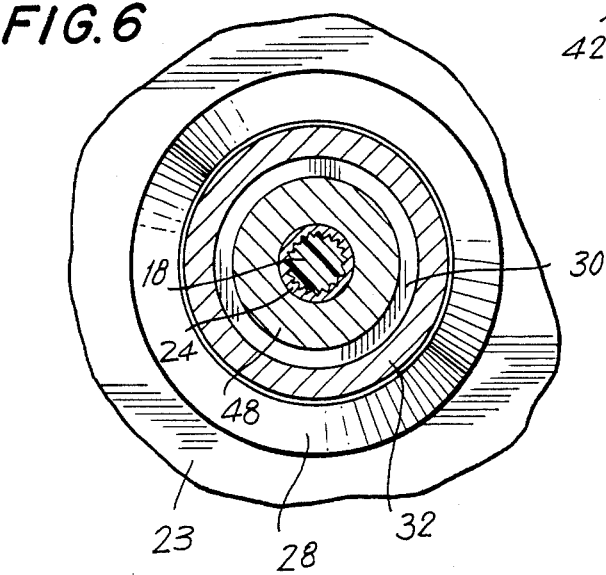
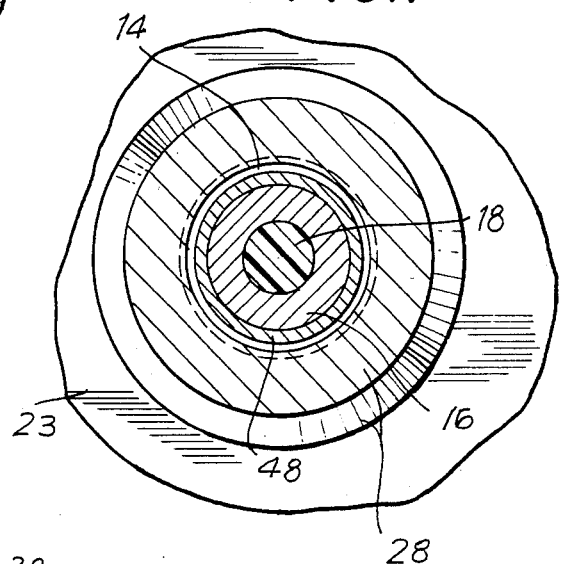
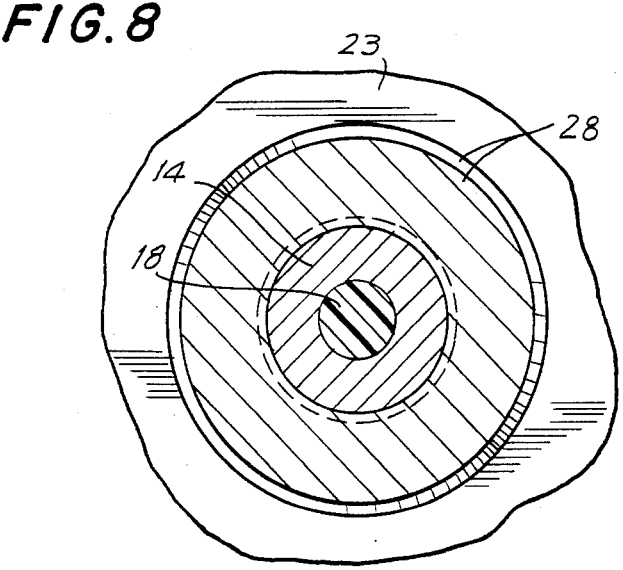

4,519,581

FAUCET HANDLE

BACKGROUND OF THE INVENTION

This invention relates to a faucet handle construction and, in particular, to a faucet handle construction for a type non-rising valve having completely concealed connection hardware.

Heretofore, faucet handle constructions had exposed set screws or other fasteners which detracted from the overall appearance of the faucet construction and weathered more quickly. In addition, prior art faucet handle constructions tended to be large and unwieldy. Accordingly, a cartridge type, non-rising valve faucet handle construction with no exposed set screws or other fasteners and having a compact, aesthetically pleasing construction is desired.

SUMMARY OF THE INVENTION

Generally speaking, in accordance with the invention, a faucet handle for a cartridge type non-rising valve assembly is provided. The handle includes a lower anchoring member for securing the handle to the outer casing of the non-rising valve assembly and a counter substrate. A rotation member coupled to the valve stem of the non-rising valve, rotates the valve stem through a limited arc of rotation between one valve-open position and another valve-closed position. An upper anchoring assembly secured to the outer casing maintains the rotation member in place and includes stops to limit the displacement of the rotation member.

Accordingly, it is an object of the invention to provide an improved faucet handle.

Another object of the invention is to provide an improved faucet faucet handle for a cartridge type non-rising valve.

A further object of the invention is to provide an improved faucet handle for a cartridge type non-rising valve which eliminates exposed set screws or fasteners.

Still another object of the invention is to provide a compact faucet handle for a cartridge type non-rising valve.

Still other objects and advantages of the invention will in part be obvious and will in part be apparent from the specification.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

BRIEF DESCRIPTION OF THE DRAWINGS

For a fuller understanding of the invention, reference is had to the following description taken in connection with the accompanying drawings in which:

FIG. 4 is an exploded perspective view of the faucet handle shown in FIGS. 1 and 3;

FIG. 5 is a cross-sectional view taken along line 5—5 of FIG. 3;

FIG. 6 is a cross-sectional view taken along line 6—6 of FIG. 3;

FIG. 7 is a cross-sectional view taken along line 7—7 of FIG. 3; and

FIG. 8 is a cross-sectional view taken along line 8—8 of FIG. 3.

DESCRIPTION OF THE PREFERRED EMBODIMENTS

Figure 1:
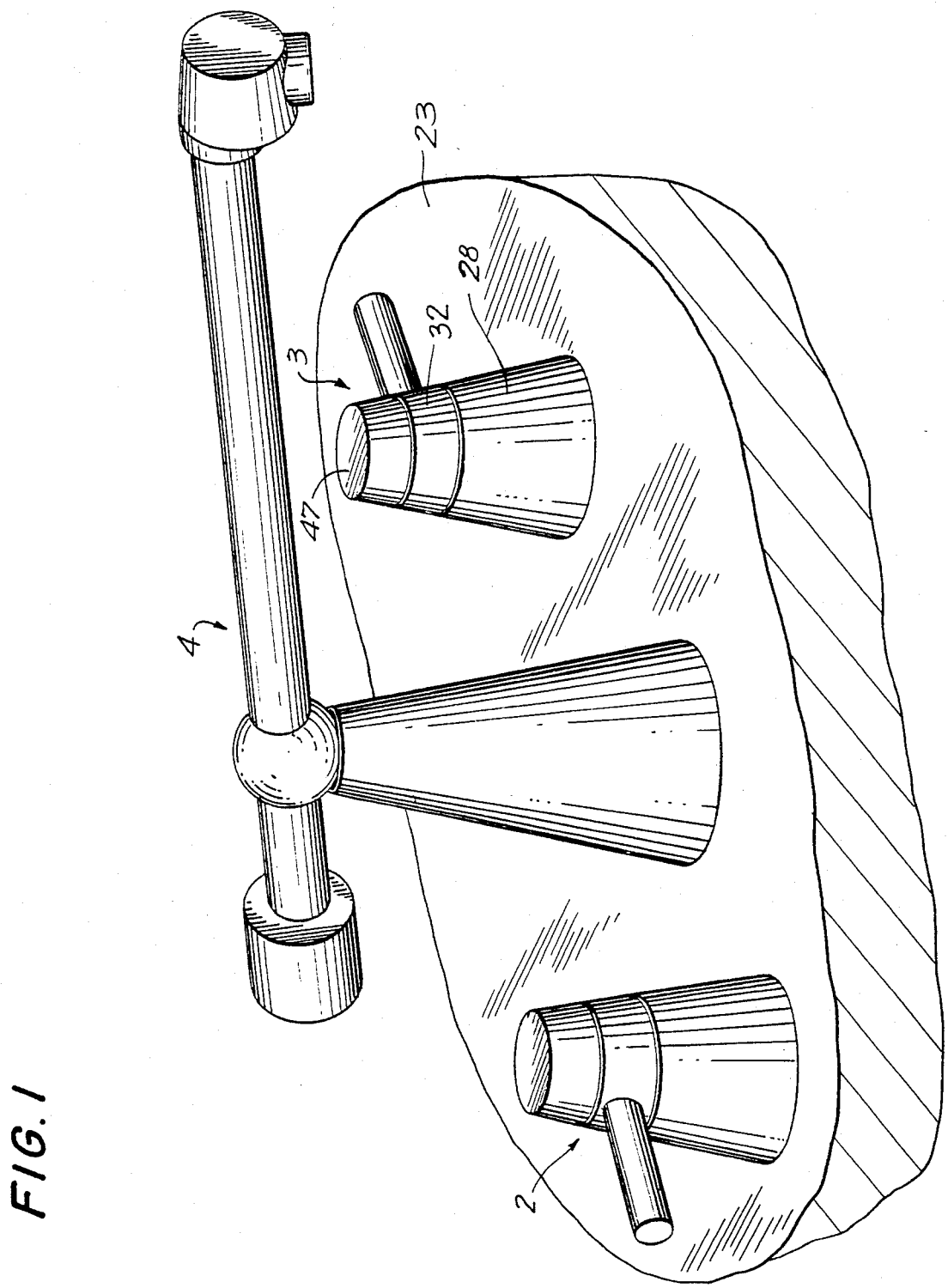
FIG. 1 is a perspective view of an installed faucet set including faucet handles constructed and arranged in accordance with the invention.
Figure 2:
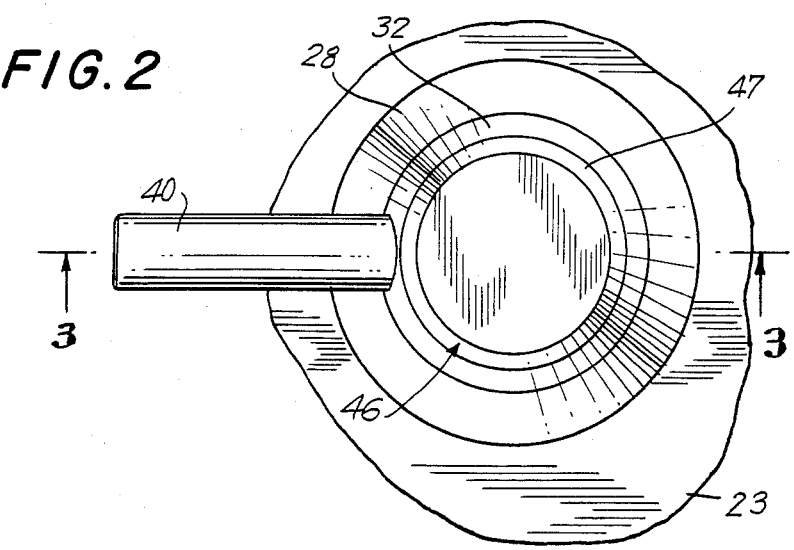
FIG. 2 is a top plan view of the faucet handle shown in FIG. 1 coupled to a cartridge type non-rising valve assembly.
Figure 3:
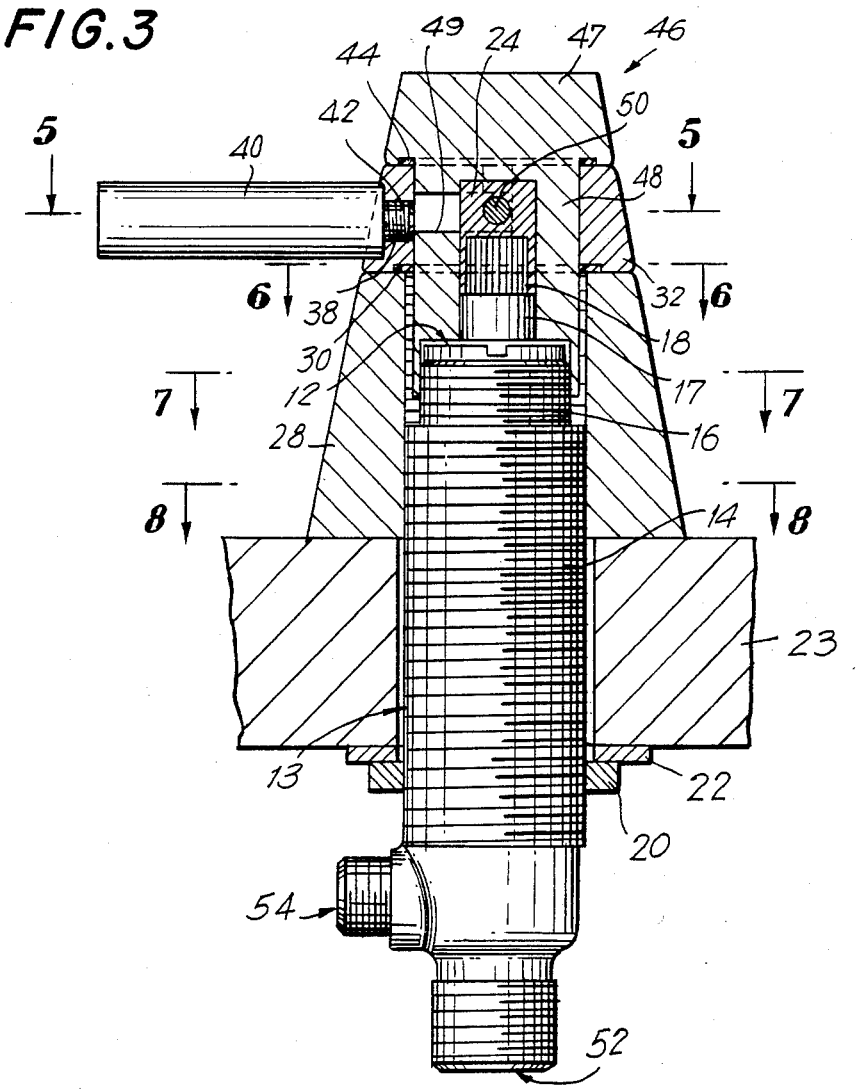
FIG. 3 is a cross-sectional view taken along line 3—3 of FIG. 2.

A faucet set shown generally in FIG. 1 includes a hot water faucet handle 2, a cold water faucet handle 3 and a faucet spout 4 all mounted to a sink or counter substrate 23. Faucet handles 2 and 3 are mounted to a cartridge type non-rising valve assembly shown generally as 12 in FIG. 4. Valve assembly 12 is seated within an externally threaded outer casing 13 which extends above the top surface of counter substrate 23 as shown in FIG. 3. Faucet handles 2 and 3 are advantageous in that they are compact and conceal from view all the connecting hardware to valve assembly 12.

Each valve handle 2 or 3 includes a lower anchoring member or escutcheon 28 which anchors faucet handle 2 or 3 to valve assembly 12 and anchors the fitting to counter substrate 23. A rotation member or handle ring 32 sits on lower anchoring member 28 and rotates through a limited arc for opening and closing valve assembly 12 in a manner which will be described in more detail below. An upper anchoring member or upper exterior section 47 secures a rotation member 32 in place and provides internal stops for limiting the rotational displacement of rotating member 32.

In the preferred embodiment of the invention as illustrated, handle ring 32 includes a handle 40 for facilitating rotation of handle ring 32 to operate the faucet set. As illustrated each of escutcheon 28, handle ring 32 and upper exterior section 47 are frustum-conical in shape and dimension to provide an overall faucet handle having a frustum-conical presentation.

Reference is now made to FIGS. 3 and 4 wherein faucet handle 2 or 3 in accordance with the invention is depicted in a partial sectional view and an exploded perspective view. Handle 2 or 3 has no exposed set screws or other fasteners when it is assembled. The connectors and fasteners and mechanism for opening and closing valve 12 are hidden from view.

Faucet handle 2 or 3 will be described in the manner in which it is assembled and coupled to a cartridge type non-rising valve assembly 12. Valve 12 has an externally threaded casing 13 with a lower threaded section 14 an upper externally threaded valve section 16 of smaller diameter than section 14. Valve 12 includes a valve stem 17 is centered above section 16 with a knurled valve stem portion 18. Rotation of valve stem 17 opens and closes the valve.

Faucet handle 2 or 3 must be assembled in a particular order. First, a nut 20 and a lower washer 22 are attached to lower threaded region 14 proximate to the bottom of valve casing 13 which includes a water inlet 52 and a water outlet 54. Washer 22 rests on top of nut 20, surrounding section 14. Next, casing 13 is inserted through an opening in a counter, sink or other installation location 23.

Escutcheon component 28 having a hollow threaded interior is screwed onto lower threaded valve section 14. Escutcheon 28 is adapted to contact counter 23 when faucet handle 2 or 3 is completely assembled. However, during assembly of faucet handle 2 or 3, escutcheon assembly 28 is screwed so as to be flush with the top of cylindrical casing 17. Next, a middle washer 30, which can be constructed of TEFLON ® is placed atop escutcheon 28. A complimentary groove (not shown) may be provided in escutcheon 28 for washer 30.

A stem adapter 24 is placed over knurled valve stem section 18. Stem adapter 24 is adapted to receive the knurled outer surface of knurled valve stem section 18. A hole 26 is formed in stem adapter 24 above the top of valve stem 17.

A handle ring 32 is placed on top of washer 30. Handle ring 32 has a handle ring aligning notch 34 on the cylindrical interior of handle ring 32. In addition, handle ring 32 has a handle receiving recess 36 on its outside surface. Centered within handle receiving recess 36 is a threaded handle receiving opening 38. An upper washer 44 is then placed on top of handle ring 32.

A top cap 46 consisting of an upper exterior section 47 and a lower annular interior section 48 is now attached. Annular section 48 is threaded on its interior surface so as to screw onto upper threaded valve section 16. In addition, lower annular interior section 48 has an annular grove 49 proximate to the top of annular section 48. Annular groove 49 extends for only a portion of the circumference of annular section 48. In a preferred embodiment of the invention annular groove 49 extends halfway around the circumference of annular section 48. Top cap 46 is screwed onto upper threaded valve section 16 until stem adapter hole 26 appears within annular groove 49. In a preferred embodiment, this is approximately three rotations.

Upper washer 44 is lifted up above annular groove 49 in annular section 48. Alternatively, washer 44 may be attached to the lower surface of section 47. Then, an aligning pin 50 is inserted through annular groove 49 into stem adapter hole 26. Next, handle ring 32 is raised and aligning pin 50 is seated within handle ring aligning notch 34. Escutcheon 28 is then screwed so that it raises upward until it meets the bottom of handle ring 32.

A handle 40, having a threaded handle extension 42 is then screwed into threaded handle receiving opening 38. A portion of handle 40 proximate to threaded handle extension 42 is received within handle receiving recess 36 so as to conceal the connection of threaded handle extension 42 and threaded handle receiving opening 38.

Now that faucet handle 2 or 3 is completely assembled, nut 20 is rotated upward on lower threaded region 14, from the underside of counter 23 so as to secure the bottom surface of escutcheon 28 flush against the top of counter 23.

The effect of the above construction is to create a faucet handle 2 or 3 which has an operating handle riding between two fixed components in a compact and aesthetically pleasing arrangement. In a preferred embodiment, faucet handle 2 or 3 is designed so that its body defines a single frustum of a cone, composed of three separate frustums one atop the other. The lower frustum is escutcheon 28 which is fixed in place on counter 23. Atop escutcheon 28 is handle ring 32 which is a frustum with its lower diameter the same as the top diameter of escutcheon 28. Above handle ring 32 is upper exterior section 47 of top cap 46 which when attached appears to be a frustum. The diameter of the bottom of upper exterior section 47 is the same as the diameter of the top of handle ring 32. In addition, the angle between the base and the side walls of the three frustum components are identical, creating the appearance of one large frustum.

Valve 12 is operated by the rotation of handle 40 about a vertical axis. The rotation of handle 40 is limited by the rotation of aligning pin 50. Aligning pin 50 rotates within annular groove 49 of annular section 48. The arc of rotation is limited by the extent of annular groove 49. If annular groove 49 extends through 180° in annular section 48, handle 40 will also rotate through an angle somewhat less than 180° due to the diameter of aligning pin 50.

Handle 40 and handle ring 32 rotate in unison. However, escutcheon 28 and upper exterior section 47 of top cap 46 are stationary at all times. This provides a compact and aesthetically attractive arrangement of components in a functioning faucet construction. In addition, the placement of aligning pin 50 completely inside faucet handle 2 or 3 means that handle 40 will move between two established end points without any exterior evidence of these end points. There is no exposed set screw or other fastener on top of the counter and faucet handle 2 or 3 is apparently a single integral unit. Because, in a preferred embodiment, faucet handle 2 or 3 has a smooth exterior, it is easier to clean and less likely to suffer rusting or other conditions caused by surfaces which are difficult to clean.

In addition, it is easy to disassemble faucet handle 2 or 3. This is accomplished by first unscrewing handle 40. Next, nut 20 and lower washer 22 are lowered to the bottom of valve casing 13. Escutcheon 28 is turned clockwise so as to expose aligning pin 50. Aligning pin 50 is pulled out of stem adapter hole 26 and top cap 46 is unscrewed. Next, handle ring 32 is removed and stem adapter 24 is lifted off valve stem 17. Escutcheon component 28 is unscrewed from lower threaded valve section 14. The valve assembly is removed from counter 23 and lower washer 22 and nut 20 are removed from the top of valve casing 13. Valve assembly 12 is now free of faucet handle 2 or 3.

In the top plan view of FIG. 1 the simplicity and compactness of the faucet handle is easily seen. FIG. 3 shows the way in which the completed faucet handle 2 or 3 is situated in relation to counter 23 and valve assembly 12. It can be easily seen that faucet handle 2 or 3 is both compact and aesthetically pleasing in its simpleness of shape and outward appearance. There are no screws or other connectors visible on the outside of assembled faucet handle 2 or 3. The outside shape of faucet handle 2 or 3 may be changed to any desired shape. For example, the outside may be cylindrically shaped or spherically shaped or even a rectangular solid. However, a faucet shape having a circular cross-section at all heights is more desirable because upon rotation of handle ring 32 the overall shape of the faucet handle remains unchanged.

Handle 40 is shown as a cylindrical member. However, there is no limitation upon the shape that handle 40 may take. It may be a knob, loop, ball, or any other shape as long as it has a threaded handle extension 42 which screws into threaded handle receiving opening 38 and handle receiving recess 36 is adapted to receive a small portion of handle 40 proximate to threaded handle extension 42.

Faucet handle 2 or 3 can be constructed of many types of suitable plumbing material. The outside surfaces can be covered with chrome or other suitable cosmetic finishing to provide an aesthetically pleasing appearance.

This faucet construction works with a non-rising type valve. The rotation assembly consisting of stem adapter 24 with stem adapter hole 26, lower annular section 48 having annular groove 49 and aligning pin 50 requires a constant vertical relationship which is only present in a non-rising type valve. If valve stem 17 rises and lowers as it rotates, this vertical alignment crucial to the functioning of a faucet handle in accordance with the invention would not be present.

Accordingly, a faucet handle for a cartridge type non-rising valve which has an operating handle that rides between two fixed components giving a compact and aesthetically arrangement is provided. In addition, there are no exposed set screws or other fasteners and, all of the attaching hardware is concealed from view. In addition, the exterior surfaces of the faucet handle are completely adaptable to change.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A faucet handle assembly for opening and closing a cartridge type non-rising valve assembly having an outer casing and a valve stem rotatable from one closed position to another open position, comprising:
   lower anchoring means for securing the faucet handle assembly to the non-rising valve assembly;
   rotation means rotatably mounted on the lower anchoring means and coupled to the valve stem for rotating the stem between the open position and the closed position wherein the rotation means comprises a valve stem cover having a hole formed therein, an aligning pin disposed in the hole, a circular member fitting around the valve stem, said circular member having an internal notch, said aligning pin extending from said valve stem cover into said notch, whereby rotational displacement of the circular member rotates the valve stem for operating the cartridge valve; and
   upper anchoring means journaled on the rotation means and coupled to the outer casing to secure the faucet handle assembly in place and maintain the rotation means in a fixed vertical orientation between the lower anchoring means and the upper anchoring means.

2. The faucet handle assembly of claim 1, wherein the circular member includes a projecting handle for facilitating rotation of the valve stem.

3. The faucet handle assembly of claim 2, wherein the upper anchoring means is a substantially cylindrical member having an upper cap, the internal diameter dimensioned for receiving the valve stem and a partial annular groove at the position of the top of the valve stem to provide stops for the aligning pin of the ends of the annular groove to restrict the rotation of the valve stem at the valve open position and the valved closed position.

4. The faucet handle assembly of claim 3 further including a handle receiving recess in the circular member to conceal the coupling of the handle to the circular member.

5. The faucet handle assembly of claim 1, wherein the faucet handle is the frustum of a cone and has a handle projecting outward from the faucet.

6. The faucet handle assembly of claim 1, wherein the upper anchoring means and the lower anchoring means remain stationary when the rotation means is rotated therebetween.

7. The faucet handle assembly of claim 3, wherein the annular groove extends about substantially half the circumference of the substantially cylindrical member.

8. The faucet handle assembly of claim 2, further including washers between the lower anchoring means and the circular member and between the circular member and the top cap.

9. The faucet handle assembly of claim 2, wherein the handle is a cylindrical member having a threaded region at one end.

10. The faucet handle assembly of claim 1, further including a nut attached to the valve underneath a connection surface to secure the faucet handle to the connection surface.

11. The faucet handle assembly of claim 10, further including a washer between the nut and the connection surface.

12. A faucet handle assembly for opening and closing a cartridge type non-rising valve assembly having a valve stem rotatable from one closed position to another open position, comprising:
    lower anchoring means for securing the faucet handle to the non-rising valve assembly;
    a valve stem cover having a hole in the valve stem cover;
    a circular member mounted on the lower anchoring means fitting around the valve stem, said circular member having an internal notch;
    an upper anchoring piece having a substantially cylindrical member and an upper cap, the internal diameter dimensioned to receive the valve stem, and a partial annular groove at the position of the top of the valve stem; and
    an aligning pin extending from the hole in the valve stem cover, through the annular groove to the internal notch;
    whereby a rotational displacement of the circular member rotates the valve stem for operating the cartridge valve.

13. The faucet handle assembly of claim 12 further including a handle projecting outward from the circular member.

14. The faucet handle assembly of claim 13 wherein the handle is cylindrical in shape.

15. The faucet handle assembly of claim 12 further including washers between the lower anchoring means and the circular member and between the circular member and the top cap; and a nut to couple the faucet handle assembly to a surface.

* * * * *